UNITED STATES PATENT OFFICE.

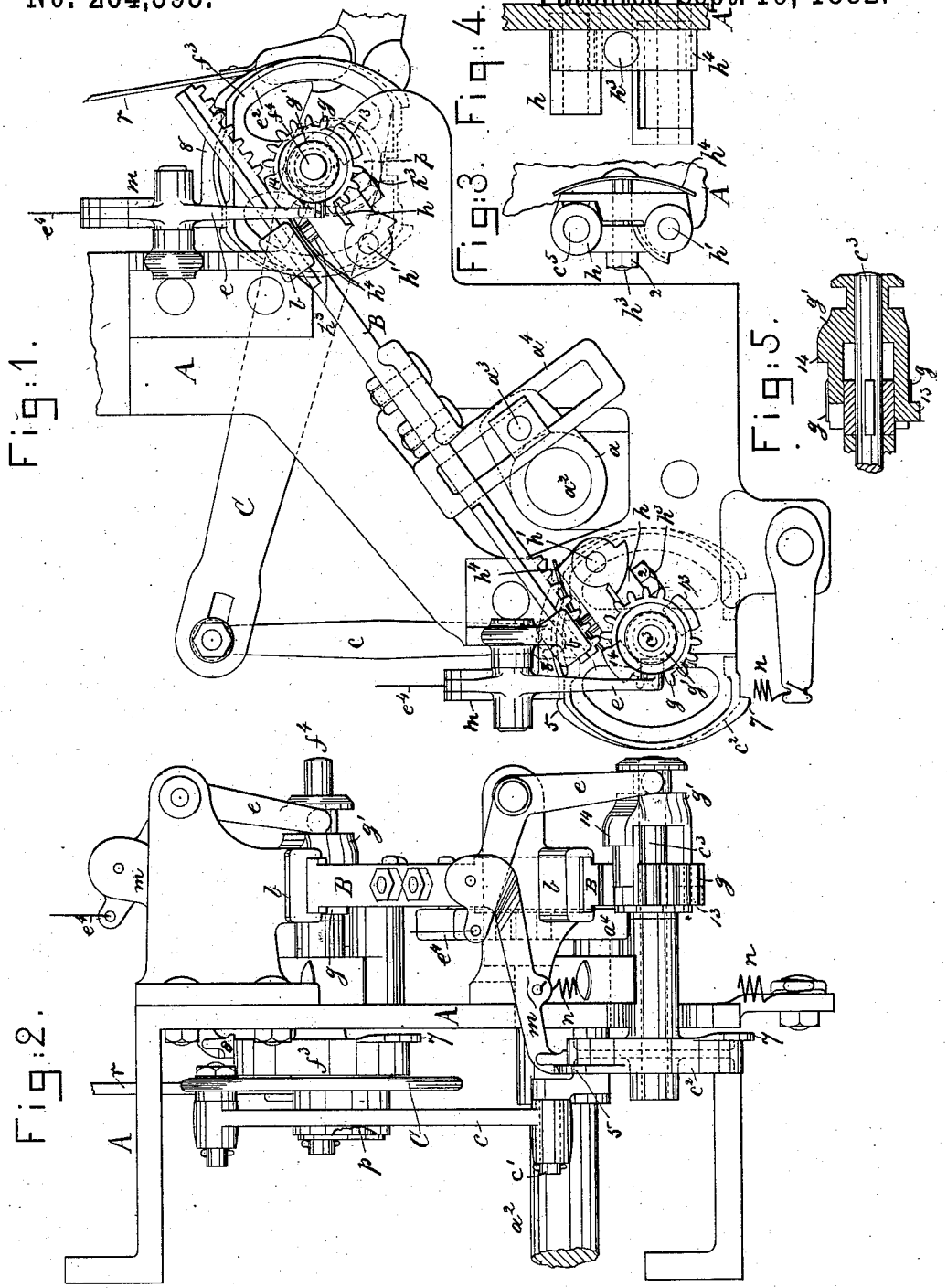

HORACE WYMAN, OF WORCESTER, MASSACHUSETTS.

MECHANICAL MOVEMENT.

SPECIFICATION forming part of Letters Patent No. 264,595, dated September 19, 1882.

Application filed August 15, 1882. (No model.)

*To all whom it may concern:*

Be it known that I, HORACE WYMAN, of Worcester, county of Worcester, State of Massachusetts, have invented an Improvement in Mechanical Movements, of which the following description, in connection with the accompanying drawings, is a specification.

This invention is an improvement on United States Patent No. 260,349, granted to me June 27, 1882, to which reference may be had, and has for its object to impart movement by reciprocating racks to the gears therein described as connected with the short shafts, which were to be moved intermittingly a semi-rotation and be then left at rest. In that patent the said gears were engaged and turned for a semi-rotation by an intermittingly-rotating master-gear. The rack herein shown, besides being cheaper and easier to run than the master-gear referred to, also enables me to turn the said gear for half a rotation in either direction.

My invention consists essentially in a reciprocating rack-bar provided with teeth near its opposite ends when combined with two gears having two series of teeth and intermediate teeth which may be engaged by the teeth of the rack-bar, or which may be so placed as to be out of the path of reciprocation of the said rack-bar; also, in the combination, with the said rack-bar or other movable toothed surface, of gears and yielding journal-boxes for the shafts carrying the said gears, whereby the said boxes and shafts may be moved bodily away from the said rack-bar or toothed surface actuating them should the gears and teeth of the said rack-bar fail to become properly engaged when brought in contact.

Figure 1 represents in side elevation a sufficient portion of a mechanical movement to enable my invention to be understood. Fig. 2 is a left-hand end elevation of Fig. 1. Figs. 3 and 4 are details of one of the yielding journal-boxes for the shafts which are to be turned by the teeth of the rack-bar or movable toothed surface which engages the gears secured to the said shafts, and Fig. 5 is a horizontal sectional detail of one of the gears $g'$.

The frame-work A, of proper shape to support the working parts, has proper bearings, $a$, for the main rotating shaft $a^2$, provided with a crank-pin, $a^3$, which enters a slotted arm, $a^4$, connected with and extended at right angles from a reciprocating rack-bar, B, held in suitable guides, $b\ b$, and provided at its under side, near each end, as herein, shown with rack-teeth, there being six rack-teeth at each end.

The gears $g$ herein shown and their independent isolated or movable teeth $l^3\ l^4$, adapted to be placed alternately in line with the teeth of the rack-bar, are as shown and described in my said patent. The teeth $l^3\ l^4$ to co-operate with each gear $g$ are carried by arms of a hub or fork, $g'$, having annular grooves (see Figs. 2 and 5) to receive pins or projections from levers $e$, such as described in my said patent, they being connected by wires $e^4$ with suitable fingers resting on pattern-surfaces. (Not shown.) The two shafts $c^3\ f^4$, link $c$, crank-pin $c'$, and lever C are substantially as in my said patent; but in this instance the shaft $f^4$ has at one end of it an eccentric, $p$, which serves as the fulcrum of lever C. The lever C has a strap, $r$, with which a counterbalancing-weight may be attached, as in my said patent. Each shaft has upon it a holding-plate, $c^2$ or $f^3$, to be engaged and held by holding devices $m$, substantially as shown in my application No. 69,431, filed concurrently with this; but in this application the said holding-plates are not claimed as they are claimed, in that application. The teeth $l^3\ l^4$ are in different vertical planes with relation to the teeth of the gear $g$; and when one tooth, $l^3$ or $l^4$—say tooth $l^4$—by the movement of a lever, $e$, is placed in the line of reciprocation of the said rack-bar, the teeth of the latter will first engage the said tooth $l^3$, and then the first tooth of the series of six teeth of the gear $g$ at the rear of it; but as soon as the toothless space at the rear of the last tooth of the said series of teeth so engaged by the teeth of the rack-bar arrives uppermost or next the rack-bar the teeth of the rack-bar and the gear pass out of mesh, and the gear and its attached shaft is then left at rest until the hub is again shifted horizontally to place the tooth $l^3$ in the line of reciprocation of the rack-bar, after which the rack-bar will engage it and then the series of teeth of gear $g$ at the rear of it and turn the gear $g$ half a rotation and again leave it at rest by reason of the toothless space at the end of the series of teeth of the gear $g$ last in engagement with the teeth of the said rack-bar. By shifting the teeth $l^3\ l^4$ between the end of one reciprocation of bar B and its return-stroke the gear $g$ and its attached shaft may be turned first in one and then in the opposite direction for half a rotation. The teeth $l^3\,l^4$, if left at rest while the bar B (it having just moved the gear $g$) is moved backward, will act to move the gear and its shaft intermittingly in but one direction; and when the gear is again to be moved in the same direction the teeth $l^3\,l^4$ will be shifted to place one of them in line with the teeth of the rack-bar during that movement of the latter which is to be effective. The shafts $c^3\,f^4$ are each supported in like boxes, $h$, pivoted at $h'$ to a stand or bracket fixed to the frame-work A. Each box receives through it a bolt, $h^3$, the head of which rests on a spring, $h^4$, of suitable strength, the nut 2 being placed on the end of the said bolt. If the teeth of a gear, $g$, and a tooth, $l^3$ or $l^4$, do not properly mesh with the teeth of the rack-bar, then the box and shaft of the said gear will yield and permit the rack to move and not break the mechanism.

Instead of gear 8 herein shown, I desire it to be understood that I might employ a gear like the gears marked $d$ or $e^6$ in my said patent, and move it longitudinally, as in my said patent, to bring one or the other of its isolated teeth properly in position in line with the teeth of the moving rack-bar B as the said gear and teeth are operated in the said patent to place the isolated teeth in line with the teeth of the rotating master-gear therein described.

In the drawings the tooth $l^4$ of the hub co-operating with the gear $g$ of the shaft $f^4$ is shown in position to be engaged by the teeth of the rack-bar as the latter is moved in its downward stroke.

Spring $n$, only partially shown in the drawings, and attached to holding devices $m$, are and will be as in my said application referred to.

I claim—

1. The reciprocating rack-bar provided near its ends with a series of teeth, combined with two gears having two series of teeth, and with intermediate teeth which may, when desired, be placed alternately in line with the teeth of the rack-bar when the latter is to move the said gear and its shaft a semi-rotation, substantially as described.

2. The shaft $c^3$, its attached gear, and the spring-held journal-box for the said shaft, combined with the movable toothed rack or surface to engage and actuate the said gear intermittingly, whereby the said gear and its shaft are free to move away from the said toothed surface should the latter and the gear fail to strike properly into mesh, substantially as described.

In testimony whereof I have signed my name to this specification in the presence of two subscribing witnesses.

HORACE WYMAN.

Witnesses:
 G. W. GREGORY,
 I. B. SYME.